United States Patent
Kohlhepp et al.

(10) Patent No.: US 12,537,291 B2
(45) Date of Patent: Jan. 27, 2026

(54) ANTENNA DEVICE, TRANSCEIVER APPARATUS, COMPENSATOR APPARATUS, VEHICLE, AND METHOD FOR OPERATING AN ANTENNA DEVICE

(71) Applicant: Continental Automotive Technologies GmbH, Hannover (DE)

(72) Inventors: Steffen Kohlhepp, Rosenheim (DE); Maximilian Klopfer, Kiefersfelden (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 54 days.

(21) Appl. No.: 18/720,474

(22) PCT Filed: Oct. 27, 2022

(86) PCT No.: PCT/DE2022/200249
§ 371 (c)(1),
(2) Date: Jun. 14, 2024

(87) PCT Pub. No.: WO2023/110027
PCT Pub. Date: Jun. 22, 2023

(65) Prior Publication Data
US 2025/0158271 A1 May 15, 2025

(30) Foreign Application Priority Data
Dec. 16, 2021 (DE) .................... 10 2021 214 557.4

(51) Int. Cl.
*H01Q 1/32* (2006.01)
(52) U.S. Cl.
CPC .................... *H01Q 1/32* (2013.01)

(58) Field of Classification Search
CPC ........... H01Q 1/32; H04B 1/3822; H04B 1/40
See application file for complete search history.

(56) References Cited

U.S. PATENT DOCUMENTS 9,491,713 B2 * 11/2016 Dykyy .................. H04W 52/16
11,043,985 B1 * 6/2021 Labadie .................. H04B 3/02
(Continued)

FOREIGN PATENT DOCUMENTS

DE 102014215578 A1 2/2016
EP 3823173 A1 5/2021

OTHER PUBLICATIONS

Office Action dated Aug. 29, 2022 from corresponding German patent application No. 10 2021 214 557.4.

(Continued)

*Primary Examiner* — Awat M Salih

(57) ABSTRACT

An antenna device comprises a transceiver apparatus and a compensator apparatus, wherein a transceiver terminal of the transceiver apparatus is connected by a connecting apparatus to a compensator terminal of the compensator apparatus. The transceiver apparatus comprises a voltage regulator which is configured to provide an output voltage for feeding the compensator apparatus at the transceiver terminal. The antenna device further comprises a feed apparatus configured to capture an actual input voltage present at the compensator terminal, to compare the actual input voltage with a predetermined target input voltage for feeding the compensator apparatus, and to regulate the actual input voltage to the predetermined target input voltage by adjusting the output voltage provided by the voltage regulator.

17 Claims, 4 Drawing Sheets

(56) References Cited

U.S. PATENT DOCUMENTS

| | | | |
|---|---|---|---|
| 11,626,896 B2* | 4/2023 | Heo | H04B 1/0458 |
| | | | 375/262 |
| 2014/0148214 A1* | 5/2014 | Sasson | H01Q 1/32 |
| | | | 455/522 |
| 2017/0099608 A1* | 4/2017 | Lam | H04B 1/16 |
| 2018/0152898 A1* | 5/2018 | Gossner | H04B 1/18 |

OTHER PUBLICATIONS

International Search Report and Written Opinion dated Feb. 1, 2023 from corresponding International patent application No. PCT/DE2022/200249.

* cited by examiner

ANTENNA DEVICE, TRANSCEIVER APPARATUS, COMPENSATOR APPARATUS, VEHICLE, AND METHOD FOR OPERATING AN ANTENNA DEVICE

The invention relates to an antenna device, a transceiver apparatus, a compensator apparatus, a vehicle, and a method for operating an antenna device.

Antenna devices, which are provided, for example, for sending and receiving car-to-car signals or car-to-X signals, comprise a transceiver apparatus and a compensator apparatus. The transceiver apparatus is designed to provide signals to be sent and to send them to the compensator apparatus and to receive and process received signals from the compensator apparatus. The transceiver apparatus is connected to the compensator apparatus via a cable in order to make it possible to transmit the signals between the transceiver apparatus and the compensator apparatus. The compensator apparatus has an antenna amplifier unit which is configured to amplify signals to be sent for sending via an antenna. Analogously, the antenna amplifier unit of the compensator apparatus is provided for amplifying signals received via the antenna so that the received signals can be forwarded via the cable to the transceiver apparatus. Another name for a compensator apparatus is also "RF front end".

In antenna devices according to the prior art, it is customary that the antenna amplifier unit of the compensator apparatus is fed by a feed voltage which is provided by the transceiver apparatus via the cable. Due to losses in the cable, the feed voltage provided by the transceiver apparatus drops along the cable, with the result that there is a voltage at the compensator apparatus that is below the feed voltage. In order to be able to provide a required operating voltage for the antenna amplifier unit, it is therefore common that a higher feed voltage is provided by the transceiver apparatus than would be needed to compensate for the voltage drop. As a result, there is a voltage at the compensator apparatus that is higher than the required operating voltage for the antenna amplifier unit. It is therefore necessary to regulate the voltage present at the compensator apparatus down to the required operating voltage. To regulate the voltage down, a voltage regulator is arranged in the compensator apparatus, which voltage regulator requires additional installation space and emits heat while regulating the voltage down. The voltage is usually regulated down by means of a DC-DC converter or a linear regulator (LDO). This results in the disadvantage that additional installation space must be provided and, if necessary, elements for dissipating heat must be provided.

It is an object of the invention to overcome the disadvantages that arise when using a voltage regulator in the compensator apparatus.

The object is achieved by the subjects of the independent patent claims. Advantageous developments of the invention are disclosed by the features of the dependent patent claims, the following description and the figures.

A first aspect of the invention relates to an antenna device which comprises a transceiver apparatus and a compensator apparatus. A transceiver terminal of the transceiver apparatus is connected by a connecting apparatus to a compensator terminal of the compensator apparatus. In other words, the antenna device has the connecting apparatus which is configured to electrically connect the transceiver terminal of the transceiver apparatus to the compensator terminal of the compensator apparatus. The transceiver apparatus is configured to output an output signal to be sent and/or to receive a received input signal at the transceiver terminal. In other words, it is provided that the transceiver apparatus is configured to send the output signals to be sent via the connecting apparatus and/or to receive the received input signals via the connecting apparatus. The compensator apparatus is configured to receive the output signal to be sent at the compensator terminal of the compensator apparatus, to amplify the output signal to be sent by an antenna amplifier unit of the compensator apparatus and to output it at an antenna terminal of the compensator apparatus. In other words, the compensator apparatus is provided to amplify the output signal to be sent by means of the antenna amplifier unit and to send as an amplified output signal at the antenna terminal to an antenna. Additionally or alternatively, the compensator apparatus is configured to receive the received input signal at the antenna terminal of the compensator apparatus, to amplify the received input signal by the antenna amplifier unit of the compensator apparatus and to output it at the compensator terminal of the compensator apparatus. In other words, the compensator apparatus is configured to receive the input signal received by the antenna at the antenna terminal, to amplify the input signal for sending to the transceiver apparatus by means of the antenna amplifier unit and to send the amplified input signal via the connecting unit to the transceiver apparatus.

It is provided that the transceiver apparatus comprises a voltage regulator which is configured to provide an output voltage for feeding the compensator apparatus at the transceiver terminal. In other words, it is provided that the antenna device has the voltage regulator which is provided for feeding the compensator apparatus. For this purpose, it is provided that the output voltage is made available to the transceiver terminal by the voltage regulator in order to provide the voltage via the connecting apparatus at the compensator terminal.

It is provided that the antenna device comprises a feed apparatus which is configured to capture an actual input voltage present at the compensator terminal, to compare the actual input voltage with a predetermined target input voltage for feeding the antenna amplifier unit, and to regulate the actual input voltage to the predetermined target input voltage by adjusting the output voltage provided by the voltage regulator. The target input voltage can be specified by the compensator apparatus. The target input voltage or a permissible value range of the input voltage can be specified in particular by requirements of the antenna amplifier unit of the compensator apparatus. In other words, the feed apparatus specifies the output voltage to be provided by the voltage regulator. The voltage regulator is not arranged in the compensator apparatus. The feed apparatus thus only captures the actual input voltage. In other words, it is provided that the feed apparatus of the antenna device is configured to determine the actual input voltage present at the compensator terminal and to compare this with the predetermined target input voltage. The feed apparatus is provided for controlling the voltage regulator to adjust the output voltage provided by the voltage regulator in such a way that the actual input voltage present at the compensator terminal corresponds to the predetermined target input voltage for feeding the compensator apparatus, in particular for feeding the antenna amplifier unit. Control can be carried out, for example, by providing a control signal that can be used to control a voltage regulator in the form of a voltage-controlled voltage regulator. The control signal can be a digital signal or a control voltage.

The invention has the advantage that provision of the required target input voltage is ensured, and so there is no need for any voltage regulator for regulating down the voltage in the compensator apparatus.

The invention also includes developments that result in further advantages.

One development of the invention provides that the compensator apparatus comprises a compensator measuring unit of the feed apparatus, which is configured to capture the actual input voltage present at the compensator terminal, and to send a value of the captured actual input voltage in an actual voltage signal via the connecting apparatus to a transceiver regulator unit of the feed apparatus in the transceiver apparatus. The actual voltage signal can be a digital or analog measurement signal that signals a voltage value of the actual input voltage. The transceiver regulator unit is configured to receive the actual voltage signal and the voltage regulator to adjust the output voltage provided by the voltage regulator. In other words, it is provided that the compensator measuring unit is configured to measure the actual input voltage present at the compensator terminal, and to send the actual voltage signal comprising the value of the captured actual input voltage via the connecting apparatus to the transceiver regulator unit. The compensator measuring unit may comprise a microcontroller or a simple electrical component which may be configured to determine the voltage and send the actual voltage signal. The transceiver regulator unit is provided for receiving the actual voltage signal and using the value of the captured actual input voltage contained therein to adjust the output voltage provided by the voltage regulator in such a manner that the actual input voltage corresponds to the target input voltage at the compensator terminal. The adjustment can be effected by transmitting the control signal to the voltage regulator. The control signal can change the output voltage to be adjusted by the voltage regulator. The output voltage is a DC voltage.

One development of the invention provides that the connecting apparatus comprises a coaxial cable. In other words, it is provided that the transceiver terminal and the compensator terminal are connected to each other by the coaxial cable. This results in the advantage that a cable which has a relatively low power loss is used to transmit input and output signals and to provide the feed voltage.

One development of the invention provides that the feed apparatus is configured to transmit the signal according to the UART standard. In other words, it is provided that the actual voltage signal, which contains the captured actual input voltage value, is transmitted from the transceiver regulator unit to the compensator measuring unit by a method which complies with the Universal Asynchronous Receiver Transmitter Standard. The transceiver regulator unit and the compensator measuring unit may have, for example, areas which allow them to communicate with each other via asynchronous data transmission methods and to transmit the actual voltage signal.

One development of the invention provides that the feed apparatus is configured to capture the actual input voltage present at the compensator terminal after the antenna amplifier unit has been respectively switched from a reception mode to a transmission mode and/or from the transmission mode to the reception mode and to send the value of the respectively captured actual input voltage in the respective actual voltage signal via the connecting apparatus to the transceiver regulator unit of the feed apparatus in the transceiver apparatus. In other words, it is provided that the actual input voltage present at the compensator terminal is captured each time by the feed apparatus after the antenna amplifier unit is switched from the reception mode to the transmission mode and/or from the transmission mode to the reception mode. This can take into account that the antenna amplifier unit may have an internal resistance which may depend on the operating mode of the antenna amplifier unit. The reception mode of the antenna amplifier unit may be switched, for example, in the antenna amplifier unit when the compensator apparatus is set to receive the input signals from the antenna at the antenna terminal, to amplify them by the antenna amplifier unit, and to provide them at the compensator terminal for the transceiver apparatus. The transmission mode may be set when the compensator apparatus is set to receive output signals at the compensator terminal, to amplify them via the antenna amplifier unit, and to provide them at the antenna terminal. For example, the capture can take place within a predetermined time window or after a predetermined time after switching.

A second aspect of the invention relates to a transceiver apparatus of an antenna device. The transceiver apparatus is configured to output an output signal to be sent and/or to receive a received input signal at a transceiver terminal. The transceiver apparatus comprises a voltage regulator which is configured to provide an output voltage for feeding a compensator apparatus at the transceiver terminal. It is provided that the transceiver apparatus comprises a transceiver regulator unit which is configured to receive an actual voltage signal comprising a value of a captured actual input voltage at a compensator terminal of a compensator apparatus, and to compare the actual input voltage with a predetermined target input voltage for feeding the compensator apparatus. The transceiver regulator unit is configured to regulate the actual input voltage to the predetermined target input voltage by adjusting the output voltage provided by the voltage controller.

A third aspect of the invention relates to a compensator apparatus of an antenna device. The compensator apparatus is configured to receive an output signal to be sent at the compensator terminal of the compensator apparatus, to amplify the output signal to be sent by an antenna amplifier unit of the compensator apparatus and to output it at an antenna terminal of the compensator apparatus. Additionally or alternatively, the compensator apparatus is configured to receive a received input signal at the antenna terminal of the compensator apparatus, to amplify the received input signal by the antenna amplifier unit of the compensator apparatus and to then output it at the compensator terminal of the compensator apparatus. It is provided that the compensator apparatus comprises a compensator measuring unit of a feed apparatus, which is configured to capture the actual input voltage present at the compensator terminal, and to send a value of the captured actual input voltage in an actual voltage signal via the connecting apparatus to a transceiver regulator unit of the feed apparatus in the transceiver apparatus.

A fourth aspect of the invention relates to a vehicle comprising at least one antenna device.

A fifth aspect of the invention relates to a method for operating an antenna device. The method comprises at least the following steps. In one step, an output voltage for feeding a compensator apparatus is provided at a transceiver terminal of a transceiver apparatus by a voltage regulator of the transceiver apparatus, wherein the transceiver terminal is connected by a connecting apparatus to a compensator terminal of the compensator apparatus. In one step, an actual input voltage present at the compensator terminal is captured by a feed apparatus of the antenna device. In a further step, the actual input voltage present at the compensator terminal is compared with a predetermined target input voltage for feeding the compensator apparatus. In a further step, the output voltage provided by the voltage regulator is adjusted by the feed apparatus in order to regulate the actual input voltage to the predetermined target input voltage.

The invention also includes developments of the transceiver apparatus according to the invention, of the compensator apparatus according to the invention, of the vehicle according to the invention and of the method according to the invention, which have features that have already been described in connection with the developments of the antenna device according to the invention. For this reason, the corresponding developments of the transceiver apparatus according to the invention, of the compensator apparatus according to the invention, of the vehicle according to the invention and of the method according to the invention are not described again here.

The invention also includes the combinations of the features of the embodiments described.

An exemplary embodiment of the invention is described below. In this respect:

The exemplary embodiment explained below is a preferred embodiment of the invention. In the exemplary embodiment, the described components of the embodiment each represent individual features of the invention that should be considered independently of one another and that each also develop the invention independently of one another and can therefore also be considered to be part of the invention individually or in a combination other than that shown. Furthermore, the embodiment described may also be supplemented by further features of the invention that have already been described.

In the figures, elements with the same function are each provided with the same reference signs.

Figure 1:
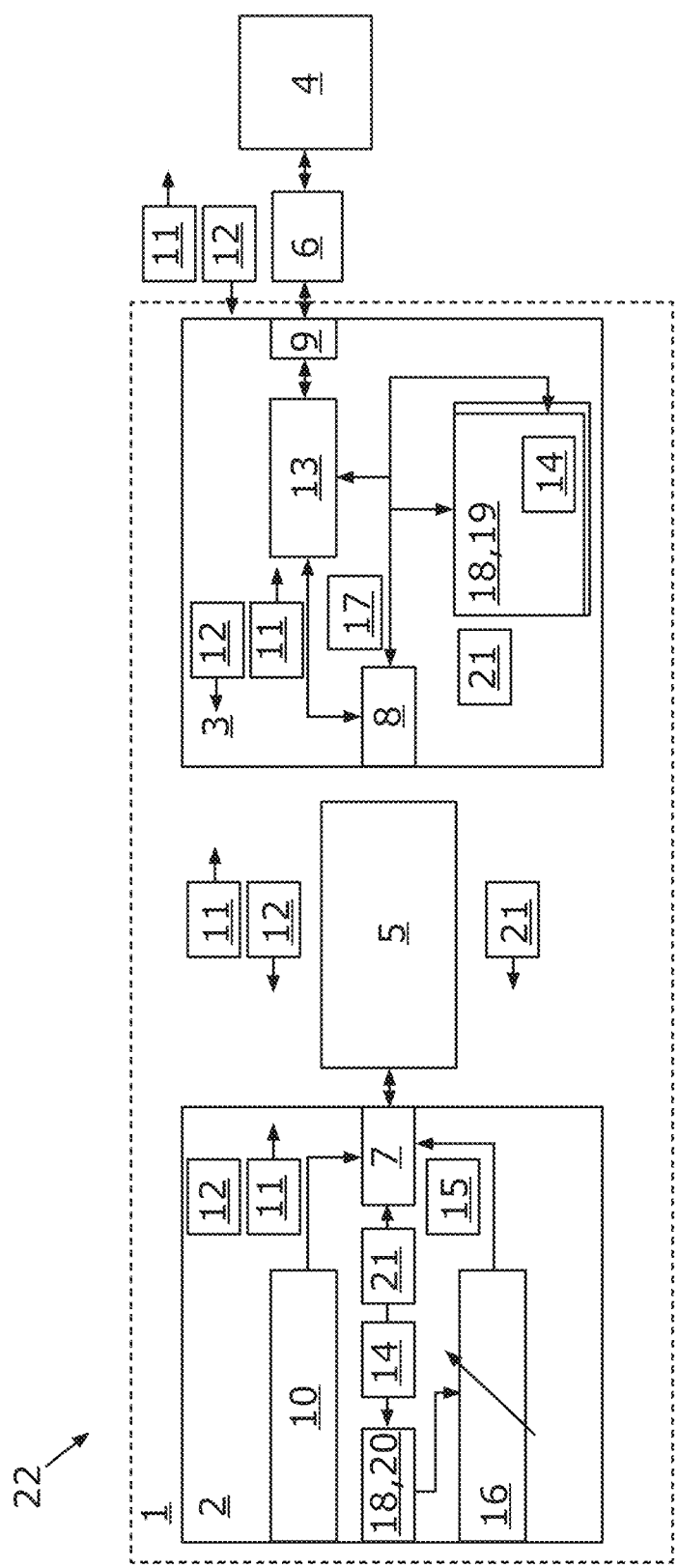
FIG. 1 shows a schematic illustration of an antenna device.

FIG. 1 shows a schematic illustration of an antenna device. The antenna device 1 may be provided for arrangement in a motor vehicle 22. The antenna device 1 may have a transceiver unit 2 and a compensator apparatus 3. The transceiver apparatus 2 may be a control unit or an interface board which may be configured to output signals 11 and/or receive input signals 12. So that the output signals 11 can be emitted with a required power, the antenna device 1 may have a compensator apparatus 3 which may be provided for amplifying the output signals 11 and forwarding them to an antenna 4. The transceiver apparatus 2 and the compensator apparatus 3 can be electrically conductively connected to each other via a connecting apparatus 5. The connecting apparatus 5 may be configured in particular as a coaxial cable. The compensator apparatus 3 can be electrically conductively connected to the antenna 4 via an antenna connection 6 and can have an antenna terminal 9. The transceiver apparatus 2 may have a transceiver terminal 7, at which the transceiver apparatus 2 can be connected to the connecting apparatus 5. The compensator apparatus 3 may have a compensator terminal 8 which may be configured to connect the compensator apparatus 3 to the connecting apparatus 5. The transceiver apparatus 2 may have a signal source 10 which may be configured to generate the output signals 11 and/or read out the input signals 12. The compensator apparatus 3 may have an antenna amplifier unit 13 which may be configured to amplify the output signals 11 prior to forwarding to the antenna 4 and/or to amplify the input signals 12 received by the antenna 4 prior to forwarding to the transceiver apparatus 2.

In order to enable operation of the antenna amplifier unit 13 and the compensator apparatus 3, it may be necessary to feed this with a required target input voltage 14 that needs to be present at the compensator terminal 8 of the compensator apparatus 3. In order to provide the target input voltage 14, it may be provided that an output voltage 15 is provided at the transceiver terminal 7 of the transceiver apparatus 2, which output voltage can be generated by a voltage regulator 16 of the transceiver apparatus 2. When the output voltage 15 at the transceiver terminal 7 is transmitted to the compensator terminal 8 via the connecting apparatus 5, a voltage drop may occur, and so it may be necessary to capture the actual input voltage 17 present at the compensator terminal 8. The actual input voltage 17 at the compensator terminal 8 can be captured by a feed apparatus 18 of the antenna device 1. For this purpose, for example, a compensator measuring unit 19 may be arranged in the compensator apparatus 3 and can capture the actual input voltage 17 at the compensator terminal 8.

The feed apparatus 18 may be provided for adjusting the output voltage 15 such that the actual input voltage 17 corresponds to the target input voltage 14. For this purpose, it may be provided that a transceiver regulator unit 20 of the feed apparatus 18 is provided in the transceiver apparatus 2. The compensator measuring unit 19 can transmit, to the transceiver regulator unit 20 via the connecting apparatus 5, an actual voltage signal 21 which can have a current value of the actual input voltage 17 or can be correlated with this. The transceiver regulator unit 20 may be provided for receiving the actual voltage signal 21 and reading out the actual input voltage 17. The transceiver regulator unit 20 can adjust the output voltage 15 so that the target input voltage 14 is present at the compensator terminal 8 as the actual input voltage 17. According to the determined change, the voltage regulator 16 of the transceiver apparatus 2 is controlled to adjust the output voltage 15. This ensures that the target input voltage 14 is provided at the compensator terminal 8.

As a result, it is not necessary to adjust the voltage arriving at the compensator terminal 8 by a regulator of the compensator apparatus 3. The regulator in the compensator apparatus 3 can thus be saved. It may be provided that the input signals 12 and the output signals 11 comply with a standard for car-to-car communication. In this case, it may be possible that reception phases 23 and transmission phases 24 can alternate. In the reception phases 23, the antenna device 1 can only be set to receive input signals 12. In the transmission phase 24, the antenna device 1 can be configured to send only output signals 11. In this case, it may be necessary for the antenna amplifier unit 13 of the compensator apparatus 3 to be switched to a reception mode in the reception phase 23 and to a transmission mode in the transmission phase 24. It is possible for respective internal resistances of the antenna amplifier unit 13 of the two modes to differ from each other. As a result, it may be necessary for a different target input voltage 14 to be provided for the antenna amplifier unit 13 during a reception phase 23 than during a transmission phase 24. For this reason, the feed apparatus 18 may be configured to capture the present actual input voltage 17, for example by the compensator measuring unit 19, when switching from a reception mode to a transmission mode or from a transmission mode to a reception mode. Accordingly, the captured actual value of the voltage 17 is transmitted by way of the actual voltage signal 21 to the transceiver regulator unit 20 which can then control the voltage regulator 16 to adjust the output voltage 15.

The compensator measuring unit 19 and the transceiver regulator unit 20 may have a respective data processing device or a respective processor apparatus that is configured to carry out an embodiment of the method according to the invention. For this purpose, the processor apparatus may have at least one microprocessor and/or at least one microcontroller and/or at least one FPGA (Field Programmable Gate Array) and/or at least one DSP (Digital Actual Voltage Signal Processor). Furthermore, the processor apparatus may have program code which is configured to perform the embodiment of the method according to the invention when executed by the processor apparatus. The program code can be stored in a data memory of the processor apparatus.

Figure 2:
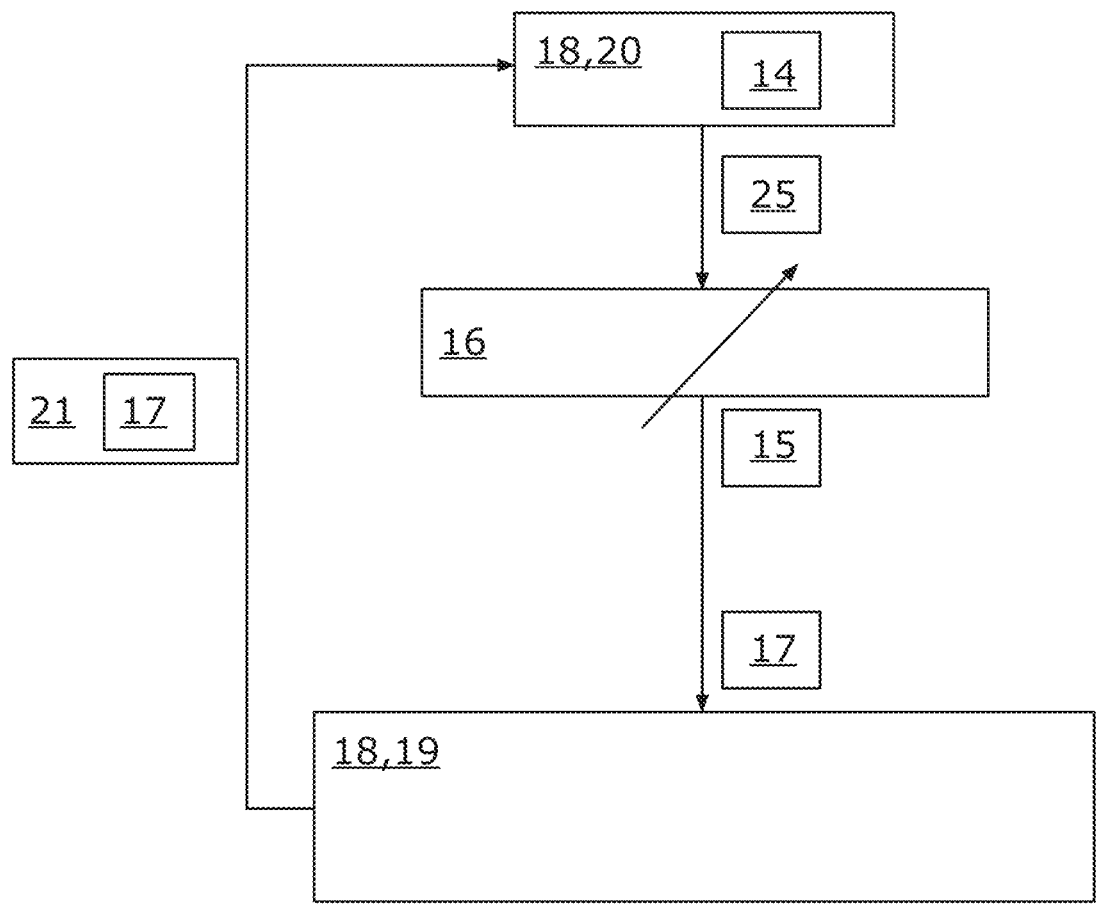
FIG. 2 shows a schematic illustration of a method for operating a feed apparatus.

FIG. 2 shows a schematic illustration of a method for operating the feed apparatus. The transceiver regulator unit 20 of the feed apparatus 18 can control the voltage regulator 16 by means of a control signal 25 such that the output voltage 15 can be provided by the voltage regulator 16. The output voltage 15 can be provided at the transceiver terminal 7, wherein the output voltage 15 can drop to the actual input voltage 17 due to the transmission via the connecting apparatus 5 to the compensator terminal 8. The actual input voltage 17 can thus be present at the compensator terminal 8. The compensator measuring unit 19 can measure the actual input voltage 17 present at the compensator terminal 8 and can transmit the captured value in the actual voltage signal 21 via the connecting apparatus 5 to the transceiver regulator unit 20. The transceiver regulator unit 20 can compare the actual input voltage 17 with the target input voltage 14 and the required output voltage 15 can be provided, which output voltage is required so that the predetermined target input voltage 14 is present at the compensator terminal 8. The transceiver regulator unit 20 can control the voltage regulator 16 to adjust the output voltage 15.

Figure 3:
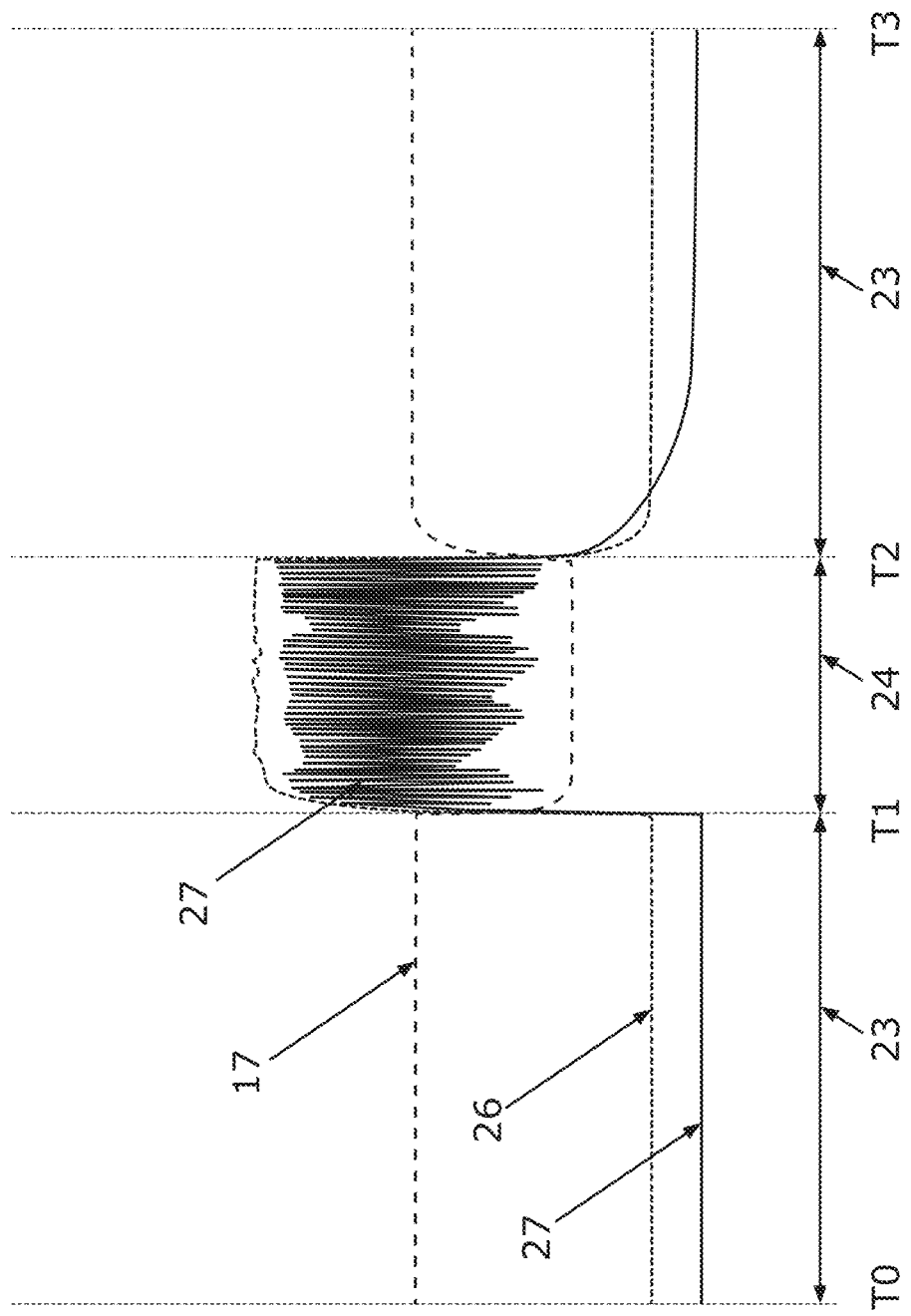
FIG. 3 shows a schematic illustration of a profile of the actual input voltage.

FIG. 3 shows a schematic illustration of a profile of the actual input voltage. A profile of the actual input voltage 17 during a reception phase 23, a transmission phase 24 and a subsequent reception phase 23 is shown. Also shown is a profile of a current intensity 26 during the phases 23, 24. In addition, an output power 27 of a signal is shown. A reception phase 23 may extend from a time T0 to a time T1, in which reception phase the antenna device 1 may be switched to a reception mode in order to receive input signals 12. A transmission phase 24 can begin at the time T1, in which transmission phase the antenna device 1 may be switched to a transmission mode in order to be able to emit output signals 11. An internal resistance of the antenna amplifier unit 13 may change during switching. This may cause the current intensity 26 and the actual input voltage 17 to change. During the transmission phase 24, the antenna device 1 may send the output signals 11 with an output power 27. The transmission phase 24 can extend from the time T1 to a time T2. A reception phase 23 can begin at the time T2, which reception phase can extend up to a time T3. During the reception phase 23, the antenna device 1 can be switched to a reception mode again, as a result of which the internal resistance of the antenna amplifier unit 13 can return to the initial value. As a result, both the actual input voltage 17 and the current intensity 26 can change. Due to the change in resistance, it is necessary to monitor the value of the actual input voltage 17 and to adjust the output voltage 15 in each of the phases 23, 24.

Figure 4:
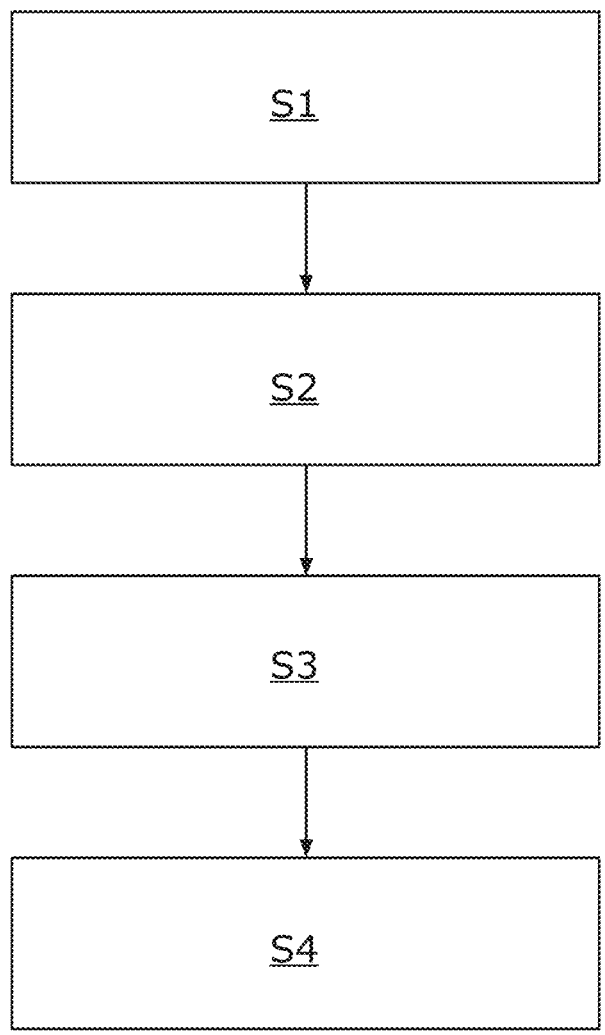
FIG. 4 shows a schematic illustration of a sequence of a method for operating an antenna device.

FIG. 4 shows a schematic illustration of a sequence of a method for operating an antenna device.

In a first step S1, an output voltage 15 for feeding an antenna amplifier unit 13 of a compensator apparatus 3 can be provided at a transceiver terminal 7 of a transceiver apparatus 2 by a voltage regulator 16 of the transceiver apparatus 2. The transceiver terminal 7 may be connected by a connecting apparatus 5 to a compensator terminal 8 of the compensator apparatus 3, wherein the output voltage 15 applied to the transceiver terminal 7 can drop to an actual input voltage 17 along the connecting apparatus 5 to the compensator terminal 8 of the compensator apparatus 3.

The present actual input voltage 17 must correspond to a target input voltage 14 which may be needed to feed the antenna amplifier unit 13 of the compensator apparatus 3. In order to check whether and how the actual input voltage 17 deviates from the target input voltage 14, the actual input voltage 17 present at the compensator terminal 8 can be captured by a feed apparatus 18 of the antenna device 1 in a second step S2. This can be carried out in particular by a compensator measuring unit 19 of the feed apparatus 18, which can be arranged in the compensator apparatus 3. A value of the actual input voltage 17 can be transmitted in an actual voltage signal 21 from the compensator measuring unit 19 to the transceiver regulator unit 20 via the connecting apparatus 5. The actual voltage signal 21 can be transmitted, for example, according to an asynchronous data transmission method, in particular UART.

The captured actual input voltage 17 can be compared by the feed apparatus 18 with the target input voltage 14 S3, wherein a deviation of the actual input voltage 17 from the target input voltage 14 is determined by the transceiver regulator unit 20. From the deviation, the transceiver regulator unit 20 can regulate the actual input voltage 17 to the target input voltage 14 by adjusting the output voltage 15 provided by the voltage regulator 16.

In a step S4, the output voltage 15 from the voltage regulator 16 can be adjusted by the feed apparatus 18 in order to regulate the actual input voltage 17 at the compensator terminal 8 to the predetermined target input voltage 14. The required target input voltage 14 can be applied by means of further capture and checking of the actual input voltage 17. This can also be effected when changing an operating mode of the antenna amplifier unit 13 in order to be able to take into account different internal resistances of the antenna amplifier unit 13 in the respective operating modes.

Remote feeding of an amplifier system has hitherto been operated with a higher voltage than is required in the amplifier system. The voltage in the amplifier system is regulated down to the required voltage using a DC/DC amplifier or LDO regulator. An amplifier is needed to regulate the input voltage down to the required voltage in the amplifier system, which costs space and money and generates additional waste heat. Remote feeding of an amplifier system via a coaxial cable and feedback of the incoming voltage by the amplifier system. Feeding back the incoming voltage makes it possible to adjust the output voltage such that the correct voltage is present in the amplifier system.

Overall, the example shows how an amplifier system can be remotely fed via a coaxial cable and feedback from the compensator apparatus can be effected via the present actual input voltage.

LIST OF REFERENCE SIGNS

1 Antenna device
2 Transceiver apparatus

3 Compensator apparatus
4 Antenna
5 Connecting apparatus
6 Antenna connection
7 Transceiver terminal
8 Compensator terminal
9 Antenna terminal
10 Signal source
11 Output signal
12 Input signal
13 Antenna amplifier unit
14 Target input voltage
15 Output voltage
16 Voltage regulator
17 Actual input voltage
18 Feed apparatus
19 Compensator measuring unit
20 Transceiver regulator unit
21 Actual voltage signal
22 Motor vehicle
23 Reception phase
24 Transmission phase
25 Control signal
26 Current intensity
27 Output power
S1-S4 Method steps
T0-T3 Times

The invention claimed is:

1. An antenna device comprising a transceiver apparatus and a compensator apparatus, wherein
a transceiver terminal of the transceiver apparatus is connected by a connecting apparatus to a compensator terminal of the compensator apparatus,
the transceiver apparatus is configured to output an output signal to be sent and/or receive a received input signal at the transceiver terminal,
the compensator apparatus is configured to receive the output signal to be sent at the compensator terminal of the compensator apparatus, to amplify the output signal to be sent by an antenna amplifier unit of the compensator apparatus and to output it at an antenna terminal of the compensator apparatus, and/or
to receive the received input signal at the antenna terminal of the compensator apparatus, to amplify the received input signal by the antenna amplifier unit of the compensator apparatus and to output it at the compensator terminal of the compensator apparatus, and
the transceiver apparatus comprises a voltage regulator configured to provide an output voltage for feeding the compensator apparatus at the transceiver terminal, wherein
the antenna device comprises a feed apparatus configured to capture an actual input voltage present at the compensator terminal, to compare the actual input voltage with a predetermined target input voltage for feeding the compensator apparatus, and to regulate the actual input voltage to the predetermined target input voltage by adjusting the output voltage provided by the voltage regulator.

2. The antenna device as claimed in claim 1, wherein
the compensator apparatus comprises a compensator measuring unit of the feed apparatus configured to capture the actual input voltage present at the compensator terminal, and to send a value of the captured actual input voltage in an actual voltage signal via the connecting apparatus to a transceiver regulator unit of the feed apparatus in the transceiver apparatus, and the transceiver regulator unit is configured to receive the actual voltage signal and to control the voltage regulator to adjust the output voltage provided by the voltage regulator in order to regulate the actual input voltage to the target input voltage.

3. The antenna device as claimed in claim 2, wherein
the feed apparatus is configured to transmit the signal according to a UART standard.

4. The antenna device as claimed in claim 2, wherein
the connecting apparatus comprises a coaxial cable.

5. The antenna device as claimed in claim 2 wherein
the feed apparatus is configured to capture the actual input voltage present at the compensator terminal when the antenna amplifier unit is switched from a reception mode to a transmission mode and/or from the transmission mode to the reception mode and to send a value of the respectively captured actual input voltage in a respective actual voltage signal via the connecting apparatus to a transceiver regulator unit of the feed apparatus in the transceiver apparatus.

6. The transceiver apparatus of an antenna device as claimed in claim 2 wherein
the transceiver apparatus is configured to output an output signal to be sent and/or receive a received input signal at the transceiver terminal,
the transceiver apparatus comprises a voltage regulator configured to provide an output voltage for feeding a compensator apparatus at the transceiver terminal, and
the transceiver apparatus comprises a transceiver regulator unit configured to receive an actual voltage signal which comprises a value of a captured actual input voltage at a compensator terminal of the compensator apparatus and to compare the actual input voltage with a predetermined target input voltage for feeding the compensator apparatus, and to regulate the actual input voltage by adjusting the output voltage provided by the voltage regulator to the predetermined target input voltage.

7. The compensator apparatus of an antenna device as claimed in claim 2 wherein
the compensator apparatus is configured to receive an output signal to be sent at the compensator terminal of the compensator apparatus, to amplify the output signal to be sent by an antenna amplifier unit of the compensator apparatus and to output it at an antenna terminal of the compensator apparatus, and/or
to receive a received input signal at the antenna terminal of the compensator apparatus,
to amplify the received input signal by the antenna amplifier unit of the compensator apparatus and to output it at the compensator terminal of the compensator apparatus, and
the compensator apparatus comprises a compensator measuring unit of a feed apparatus configured to capture the actual input voltage present at the compensator terminal, and to send a value of the captured actual input voltage in an actual voltage signal via the connecting apparatus to a transceiver regulator unit of the feed apparatus in the transceiver apparatus.

8. The antenna device as claimed in claim 2, wherein
the connecting apparatus comprises a coaxial cable,
the feed apparatus is configured to transmit the signal according to a UART standard, and
the feed apparatus is configured to capture the actual input voltage present at the compensator terminal when the antenna amplifier unit is switched from a reception mode to a transmission mode and/or from the transmission mode to the reception mode and to send a value of the respectively captured actual input voltage in a respective actual voltage signal via the connecting apparatus to a transceiver regulator unit of the feed apparatus in the transceiver apparatus.

9. The transceiver apparatus of an antenna device as claimed in claim 8, wherein
the transceiver apparatus is configured to output an output signal to be sent and/or receive a received input signal at the transceiver terminal,
the transceiver apparatus comprises a voltage regulator configured to provide an output voltage for feeding a compensator apparatus at the transceiver terminal, and
the transceiver apparatus comprises a transceiver regulator unit configured to receive an actual voltage signal which comprises a value of a captured actual input voltage at a compensator terminal of the compensator apparatus and to compare the actual input voltage with a predetermined target input voltage for feeding the compensator apparatus, and to regulate the actual input voltage by adjusting the output voltage provided by the voltage regulator to the predetermined target input voltage.

10. The compensator apparatus of an antenna device as claimed in claim 8, wherein
the compensator apparatus is configured to receive an output signal to be sent at the compensator terminal of the compensator apparatus, to amplify the output signal to be sent by an antenna amplifier unit of the compensator apparatus and to output it at an antenna terminal of the compensator apparatus, and/or
to receive a received input signal at the antenna terminal of the compensator apparatus,
to amplify the received input signal by the antenna amplifier unit of the compensator apparatus and to output it at the compensator terminal of the compensator apparatus, and
the compensator apparatus comprises a compensator measuring unit of a feed apparatus configured to capture the actual input voltage present at the compensator terminal, and to send a value of the captured actual input voltage in an actual voltage signal via the connecting apparatus to a transceiver regulator unit of the feed apparatus in the transceiver apparatus.

11. A vehicle comprising at least one antenna device as claimed in claim 8.

12. The antenna device as claimed in claim 1, wherein the connecting apparatus comprises a coaxial cable.

13. The antenna device as claimed in claim 1, wherein the feed apparatus is configured to capture the actual input voltage present at the compensator terminal when the antenna amplifier unit is switched from a reception mode to a transmission mode and/or from the transmission mode to the reception mode and to send a value of the respectively captured actual input voltage in a respective actual voltage signal via the connecting apparatus to a transceiver regulator unit of the feed apparatus in the transceiver apparatus.

14. The transceiver apparatus of an antenna device as claimed in claim 1, wherein
the transceiver apparatus is configured to output an output signal to be sent and/or receive a received input signal at the transceiver terminal,
the transceiver apparatus comprises a voltage regulator which is configured to provide an output voltage for feeding a compensator apparatus at the transceiver terminal, and
the transceiver apparatus comprises a transceiver regulator unit configured to receive an actual voltage signal which comprises a value of a captured actual input voltage at a compensator terminal of the compensator apparatus and to compare the actual input voltage with a predetermined target input voltage for feeding the compensator apparatus, and to regulate the actual input voltage by adjusting the output voltage provided by the voltage regulator to the predetermined target input voltage.

15. The compensator apparatus of an antenna device as claimed in claim 1, wherein
the compensator apparatus is configured to receive an output signal to be sent at the compensator terminal of the compensator apparatus, to amplify the output signal to be sent by an antenna amplifier unit of the compensator apparatus and to output it at an antenna terminal of the compensator apparatus, and/or
to receive a received input signal at the antenna terminal of the compensator apparatus, to amplify the received input signal by the antenna amplifier unit of the compensator apparatus and to output it at the compensator terminal of the compensator apparatus, and
the compensator apparatus comprises a compensator measuring unit of a feed apparatus configured to capture the actual input voltage present at the compensator terminal, and to send a value of the captured actual input voltage in an actual voltage signal via the connecting apparatus to a transceiver regulator unit of the feed apparatus in the transceiver apparatus.

16. A vehicle comprising at least one antenna device as claimed in claim 1.

17. A method for operating an antenna device as claimed in claim 1, comprising the steps of:
providing an output voltage for feeding a compensator apparatus at a transceiver terminal of a transceiver apparatus by a voltage regulator of the transceiver apparatus, wherein the transceiver terminal is connected by a connecting apparatus to a compensator terminal of the compensator apparatus,
capturing an actual input voltage present at the compensator terminal by a feed apparatus of the antenna device,
comparing the actual input voltage present at the compensator terminal with a predetermined target input voltage for feeding the compensator apparatus, and
adjusting the output voltage provided by the voltage regulator by the feed apparatus in order to regulate the actual input voltage to the predetermined target input voltage.

* * * * *